United States Patent [19]
Mix et al.

[11] Patent Number: 5,244,756
[45] Date of Patent: Sep. 14, 1993

[54] STORAGE BATTERY AND METHOD OF CONNECTING CASE SEALED TERMINALS TO INTERNAL ELECTRODE PLATES

[75] Inventors: Renard E. Mix, Yorktown; Stephen T. Crisler, Noblesville, both of Ind.

[73] Assignee: General Motors Corporation, Detroit, Mich.

[21] Appl. No.: 810,088

[22] Filed: Dec. 19, 1991

[51] Int. Cl.$^5$ .............................................. H01M 2/28
[52] U.S. Cl. .................................... 429/160; 429/161; 29/623.4; 228/180.1; 228/222
[58] Field of Search .................... 429/158–161, 429/179; 29/623.4; 228/180.1, 222

[56] References Cited

U.S. PATENT DOCUMENTS

| | | | |
|---|---|---|---|
| 2,326,537 | 8/1943 | Hill | 429/161 |
| 4,237,603 | 12/1980 | Crow | 29/623.4 |
| 4,800,142 | 1/1989 | Bish et al. | 429/161 X |

FOREIGN PATENT DOCUMENTS

| | | | |
|---|---|---|---|
| 1585105 | 1/1970 | France | 228/222 |
| 55-109365 | 8/1980 | Japan | 429/161 |

OTHER PUBLICATIONS

U.S. Ser. No. 07/580,977 filed Sep. 12, 1990, "Bipolar Battery and Assembly Method", assigned to the assignee of the present invention. (now U.S. Pat. No. 5,106,708).

U.S. Ser. No. 07/753,495 filed Sep. 3, 1991, "Battery Construction and Method of Connecting Terminals to Electrodes", assigned to the assignee of the present invention.

*Primary Examiner*—Stephen Kalafut
*Attorney, Agent, or Firm*—Lawrence B. Plant

[57] ABSTRACT

In this invention, lead based battery terminal units are molded in a fluid tight manner into the main body of a polypropylene battery case so that only the outer ends of the terminal units are external to the case. The terminal units have elongated straps slotted to receive the projecting lugs integral with positive and negative lead based electrode plates, which are interleaved with one another and with glass mat separators. After the plates and separators are installed and the extending electrode plate lugs appropriately fitted in the slots of the straps, flux and glass beads are inserted in the void areas in a strap-lug amalgamation zone. The case is subsequently closed by a polypropylene cover plate which is heat sealed thereto to form a substantially water tight assembly. The closed case is partially inserted in a tank containing a level of circulating cooling water. With the case being cooled by the water a low voltage magnetic induction welding head assembly mounted within the tank can be electrically energized to provide a high frequency welding field that heats the strap and the lugs so that the lugs and strap metals fuse together. The battery is subsequently completed by the addition of electrolyte.

11 Claims, 5 Drawing Sheets

STORAGE BATTERY AND METHOD OF CONNECTING CASE SEALED TERMINALS TO INTERNAL ELECTRODE PLATES

FIELD OF THE INVENTION

This invention relates to construction of multi-plate storage batteries and to a new and improved method of making a sealed storage battery in which the terminals are fluid sealed in a heat sensitive case of plastics material, and the electrode plates are internally amalgamated to the terminal straps within the case without heat degradation of the case.

BACKGROUND OF THE INVENTION

Prior to the present invention, bi-polar lead-acid and other electric charge storage batteries have been built with positive and negative electrode plates interleaved with one another and with glass mat separators all operatively mounted within an acid resistant battery case of polypropylene, or other suitable material which is heat sensitive to the prior terminal-electrode plate amalgamation processes. These prior batteries also have various fluid sealing structures and arrangements, and employ various methods of sealing that prevent or reduce the escape of electrolyte therefrom. While such batteries have been generally acceptable and have met requirements, new and improved constructions and methods are desired to meet higher standards for new and improved fluid sealed batteries with cases that are not damaged by the heat required for terminal strap-lug fusion. Accordingly, the present invention provides a higher standard for sealed batteries, and method of manufacture of such batteries.

In a preferred embodiment of this invention, a polypropylene case for a storage battery is molded with electric terminal units therein so that the terminal is completely surrounded by (e.g. embedded in) the material of the case so that there will be no significant leakage of the electrolyte from the case after the battery has been completely assembled.

The positive and negative terminal units of this invention feature elongated straps extending internal of the case and are slotted to from channels is therein to respectively receive the projecting lugs of corresponding internal positive and negative polarity lead based electrode plates, which are interleaved with one another and with glass mat separators. After the plates and separators are installed in the case, with the extending electrode plate lugs appropriately fitted in the channels of the straps.

The case is closed by a cover plate which is heat sealed thereto to form a substantially water tight assembly, but having amalgamation gas escape vent holes strategically located therein. The closed case is partially immersed in a tank containing a level of circulated cooling water supplied thereto without water leakage into the sealed case. With the polypropylene case being cooled by the circulated water to prevent heat damage thereto, a low voltage magnetic induction welding head assembly mounted within the tank can be energized to provide a high frequency welding field that heats the strap and the lugs of the electrode plates of one polarity in a burn zone so that the lugs and strap metals effectively fuse together.

Subsequently, the case is turned 180 degrees and the strap and lugs of the electrode plates of the opposite polarity are fused together in a second burn operation as described in connection with the first burn. The case is then removed from the tank and conveyed to a station where the electrolyte is added through the vent holes which are then sealed. One way valving is conventionally employed in the casing to allow a low pressure gas build up and release at the maximum allowed pressure. Most preferably flux and glass beads are inserted and packed in the void areas in the strap-lug amalgamation zone (i.e., in and about the lugs in the channel) before sealing the cover to the case. The burn zone is accordingly cleaned by the flux during burning while the lugs are laterally supported with respect to one another by the glass beads.

These and other features, advantages and objects of this invention will become more apparent from the following detailed description and drawings in which:

DETAILED DESCRIPTION OF THE INVENTION

Figure 1:
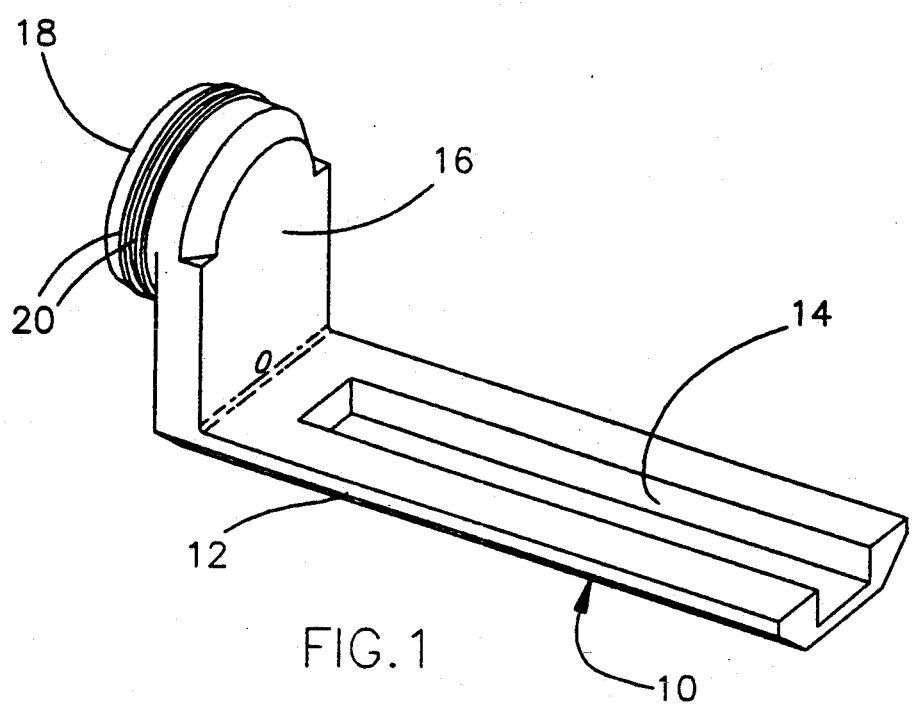
FIG. 1 is a pictorial view of one of the battery terminal units.

Turning now in greater detail to the drawings, there is shown in FIG. 1 a molded lead based terminal unit 10 formed with an elongated linear strap 12 with an elongated channel 14 therein, which opens at one end of the strap and extends therefrom to an upright portion 16 that has at its upper end, an outwardly projecting cylindrical connector terminal 18. The connector terminal 18 has external cylindrical fluid seal rings 20, and is internally threaded at 24 (See FIG. 2) to receive conventional threaded fasteners used to attach the terminal unit to leads for connection to the electrical system with which the battery is to be used.

Figure 2:
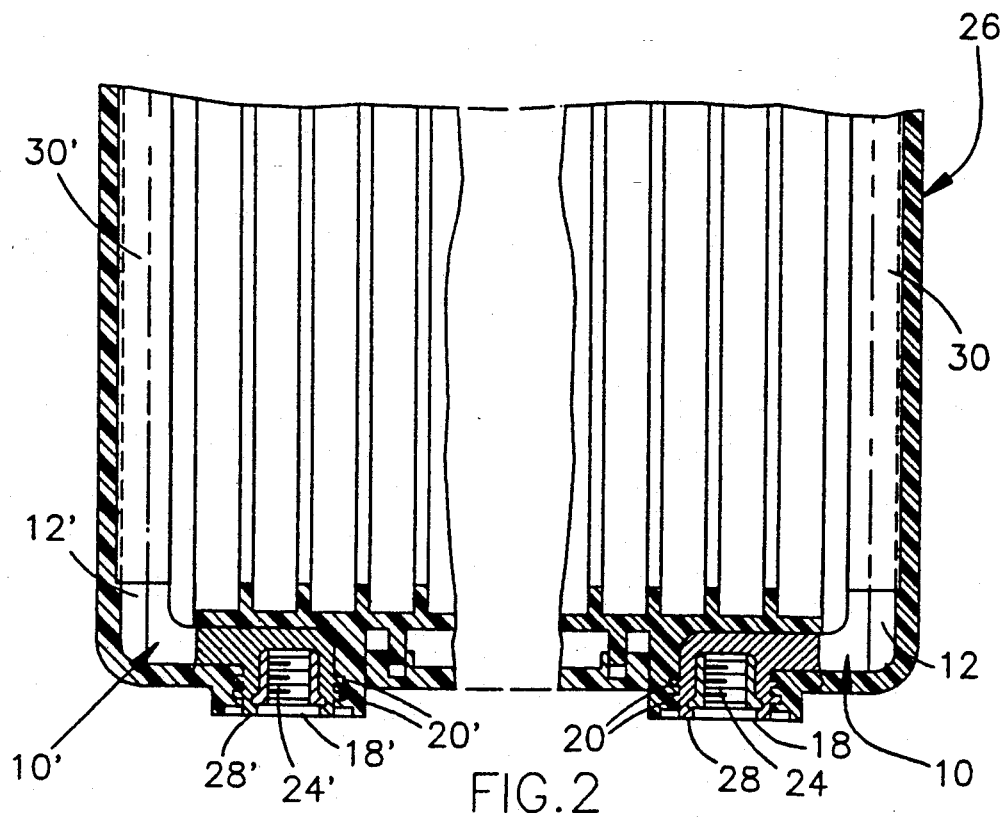
FIG. 2 is a sectional view with parts broken away of a battery case with the battery terminal units of FIG. 1 molded therein.

In the preferred embodiment, each battery has two terminal units which are identified as 10 and 10' in FIG. 2 which are molded within a main case 26 of polypropylene or other suitable material that cannot be corroded or otherwise degraded by the electrolyte used in storage batteries. With the exception of the outer end portions 28, 28' of the terminals that are internally threaded, the terminal units 10, 10' are molded into the case material and reside completely inside of the main case. The portions of terminal unit 10' corresponding to identical portions of terminal unit 10 are identified by the same reference numerals but which are primed. Wall portions 29, 29' (See FIG. 4) of the case capture and retain the strap portions of the terminals in position within the case.

The annular seal rings 20, 20' associated with each terminal 18, 18' are designed to fit in a fluid tight manner as are the other portions of the terminal unit when the case shrinks following molding thereof around the terminal units to ensure that there is no leakage of the electrolyte from the battery to the exterior thereof once it has been completely assembled.

Preferably, a suitable shell-like heat insulator 30, 30' of thin wall material is disposed around the outer peripheral areas of the straps 12, 12' to insulate the case from heat degradation during the amalgamation of the lugs of the electrode plates to the straps of the terminal units that will be described below.

Figure 3:
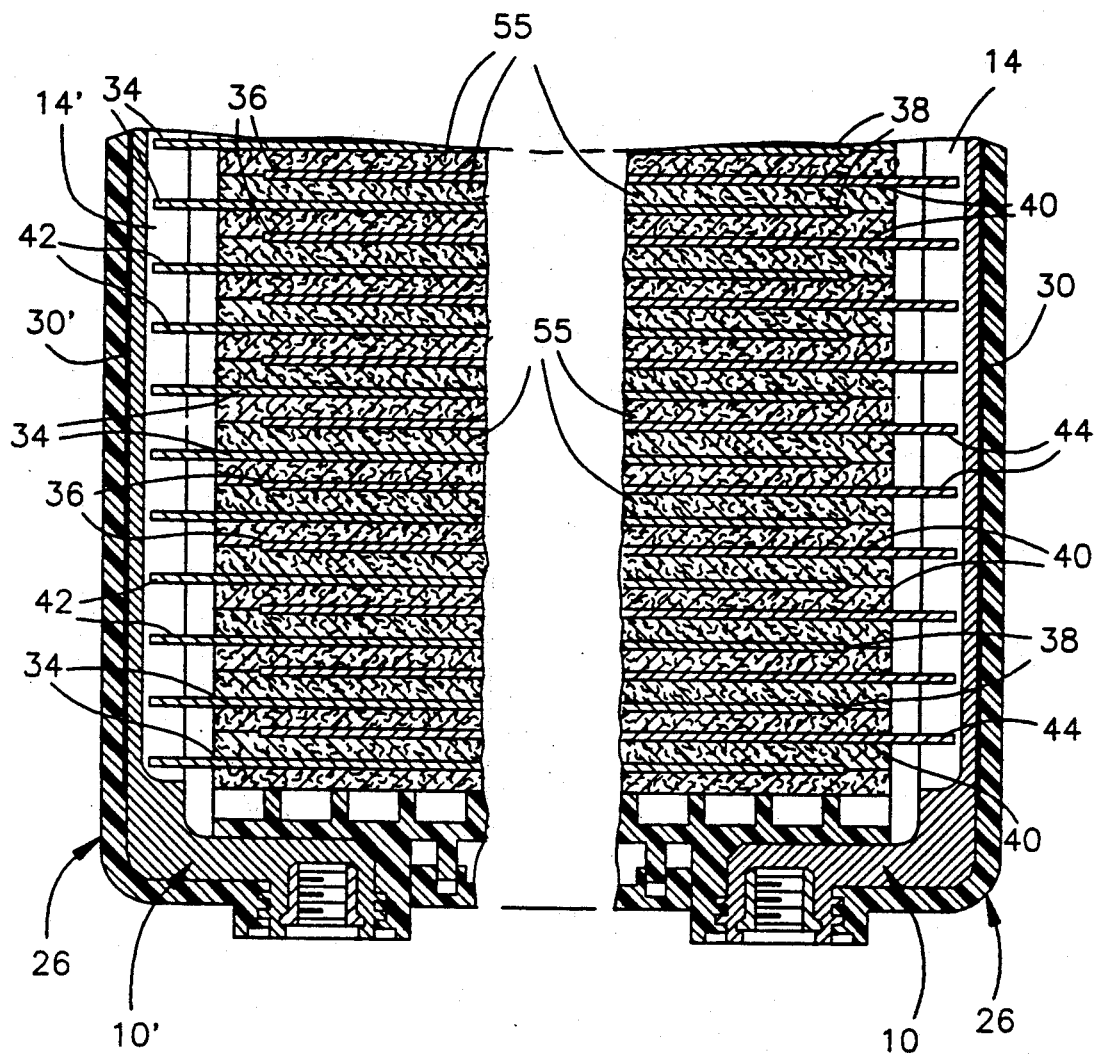
FIG. 3 is a sectional view similar to the view of FIG. 2 with the electrode plates and interlayered mats installed therein.
Figure 4:
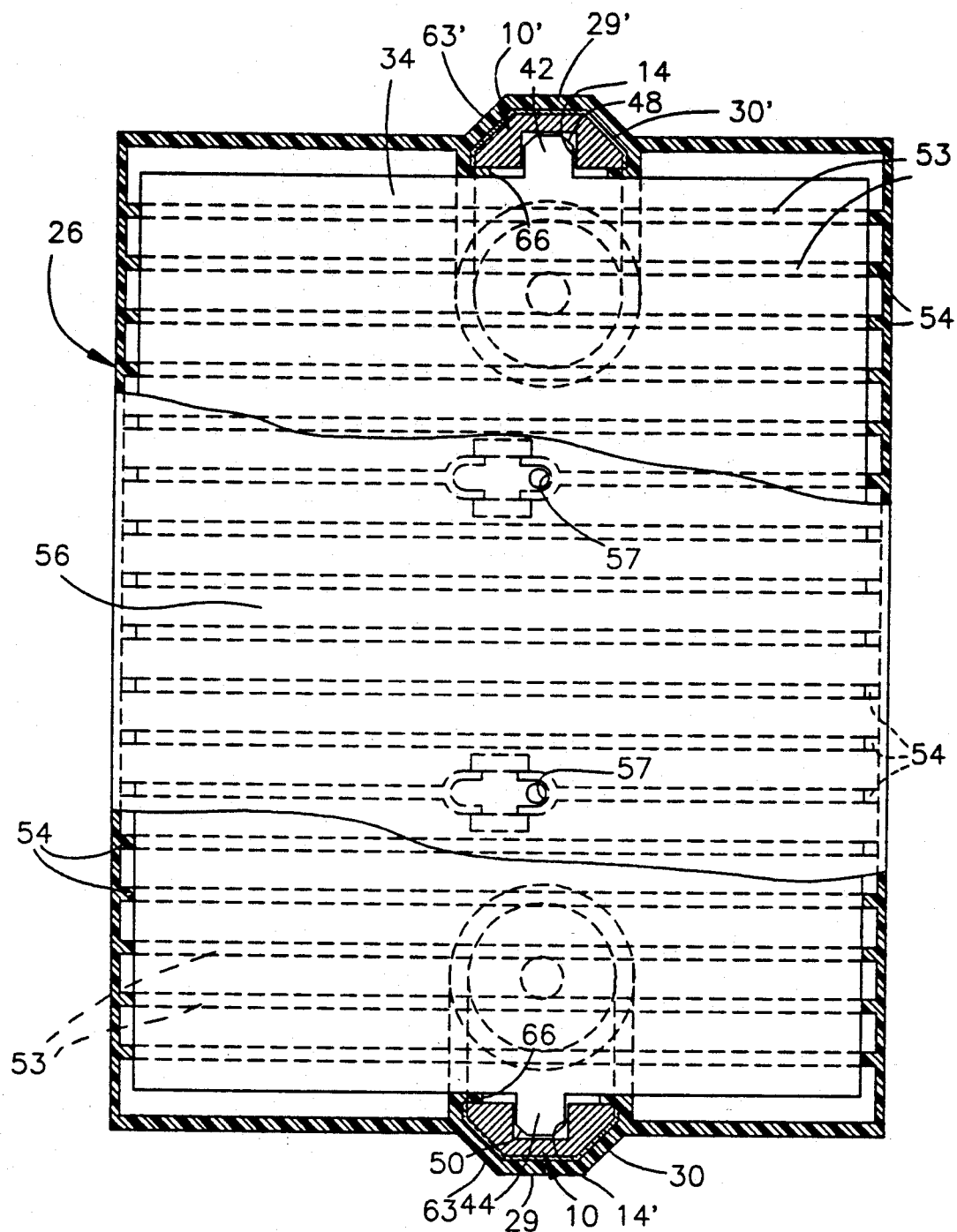
FIG. 4 is a plan view with parts broken away of the battery case of FIG. 2 having the terminal units molded therein.

Turning now to FIG. 3, there are respectively illustrated positive and negative electrode plates 34, 36 in the left hand portion, and positive and negative electrode plates 38, 40 in the right hand portion of this Figure. The left hand positive electrode plates and the right hand negative electrode plates respectively have connector lugs 42, and 44 that are adapted to fit within the elongated channels 14, 14' formed in the straps of the terminal units 10, 10'. As shown best in FIGS. 3 and 4, the lugs 42, 44 are integral with and extend from the main body of each respective plates 34 and 40'. As best shown in FIG. 4, the lugs 42, 44 are formed with beveled edges 48, 50 to cooperate with the respective channels 14, 14' in the terminal units to provide space for insertion of generally spherical glass beads to be discussed hereinafter in conjunction with FIGS. 5-7. The straps themselves are nested in elongated protruding wall portions 63 and 63' and are held therein by retainer channels 66.

Figure 5:
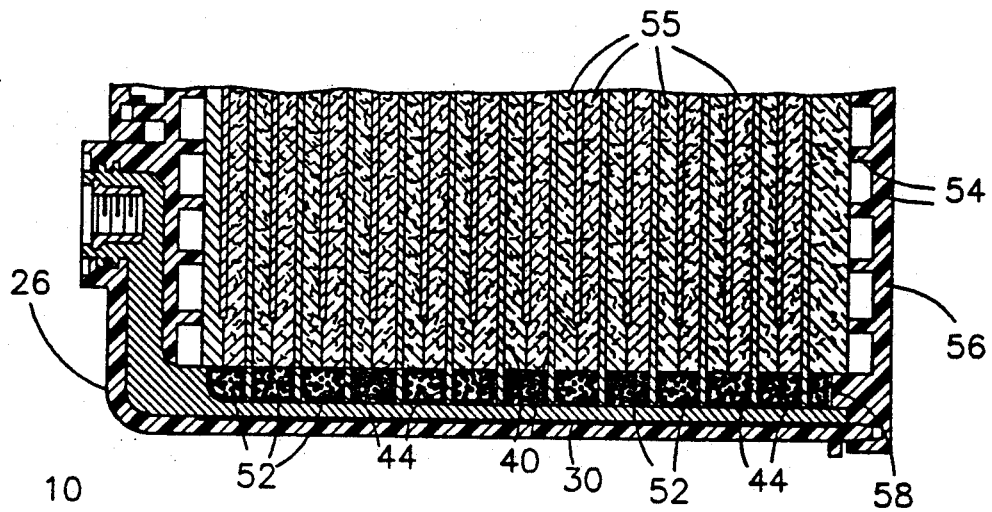
FIG. 5 is a sectional showing the lower half of the case of FIG. 3 with electrode plates and mats stacked in the case and with beads packed between the lugs and with a cover plate heat welded to close the case.
Figure 6:
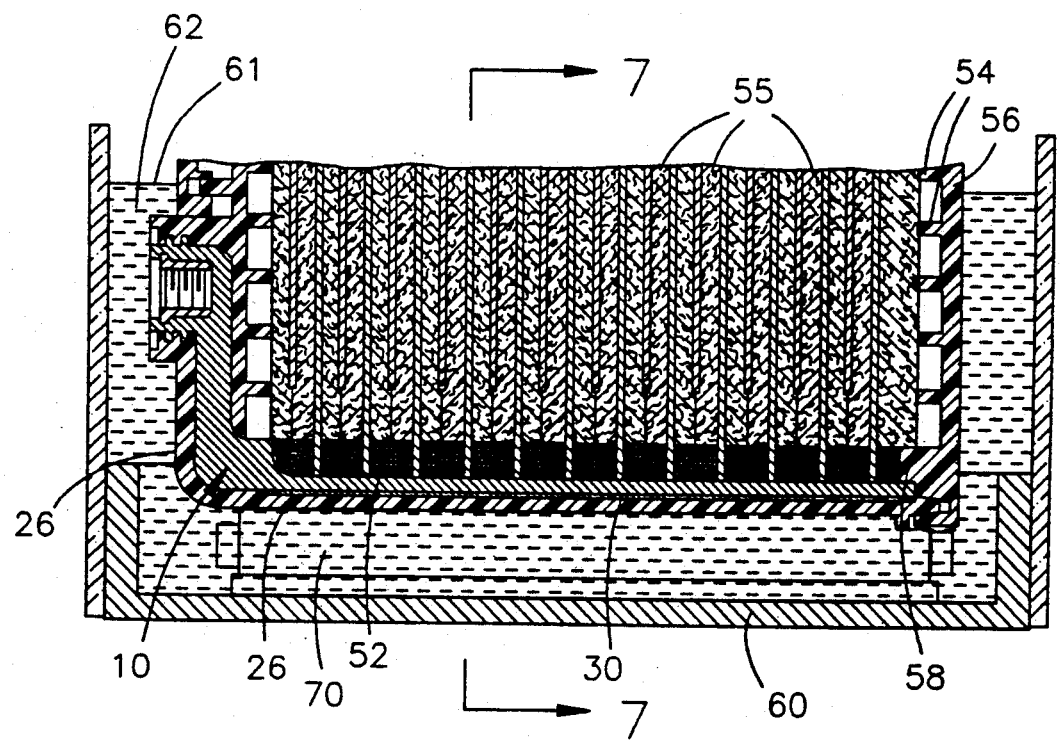
FIG. 6 is a sectional view similar to the view of FIG. 5 showing the case positioned on an induction weld mechanism in a tank of cooling water before amalgamation of the electrode plate lugs to the associated strap.
Figure 7:
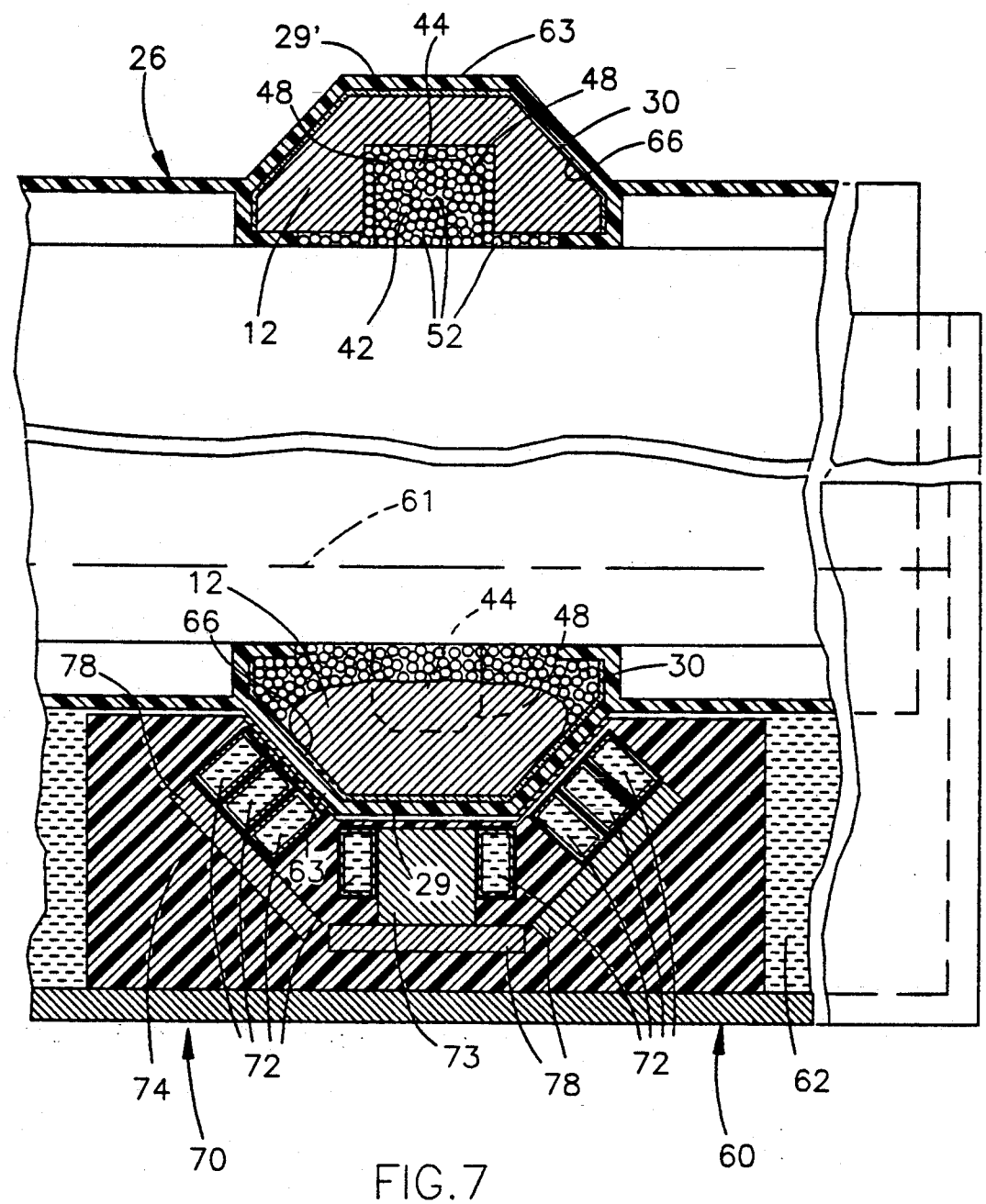
FIG. 7 is a cross sectional view of the construction of FIG. 6 illustrating the amalgamation of the lower lugs of the electrode plates of one polarity to the associated strap by induction welding mechanism of FIG. 6 and the upper lugs ready to be subsequently amalgamated to the associated strap.

As best shown in FIGS. 5-7, glass beads 52, when added in sufficient quantity, support and protect plate lugs 44 and side walls of the terminal strap during the heating and melting of the lug-strap alloy and are effective to support the near molten lugs 44 as the burn progresses and molten lead of the strap runs into the channel thereof allowing effective heat transfer from the molten strap alloy into the lugs so that they also become molten beginning at the tips thereof. The glass beads while rising to the top of the melt further serve as a heat distributing media and allow sufficient time for the plate strap to melt more uniformly from one end to the other to progressively fill the channels.

The glass beads can also be effectively used to carry the flux into the burn zone to clean the zone while supporting and protecting the plate lugs and side walls of the terminal strap during the heating and melting of the plate strap metal. In this bead-flux mixture the glass beads still act as the heat distributing media to allow time for the plate strap to melt more uniformly from one end to the other to fill the channel in the straps and amalgamate with the lugs.

The glass beads advantageously alter the molten lead surface tension at the melting zone of the lugs while they still support the soft un-melted portion of the lugs. With the molten lead in motion incident to the inductive melting, other lead in contact with it melts more readily than if it is stationary. The glass beads control this lead in motion in this application by causing the molten lead to flow into the channel and rise more uniformly around and between the lugs water melting them as the lead to the level provided by the mat. During amalgamation the glass beads rise to the top side of the melt.

As variously shown in FIGS. 4-6, the main case 26 is molded with elongated spacers 53 that run across the main width of the body and spacers 54 that extend up the sides thereof to space the electrode plates and separate mats 55 from the walls of the case.

In the build of the battery, glass mat separators 55 are interleaved between positive and negative electrode plates until the main case is filled with these battery elements. During this assembly, the lugs of each of the outer positive and negative electrode plates are interfitted in the channel of their associated straps. With the case loaded as shown in FIGS. 3 and 4, the beads 52 and a suitable flux such as azelaic powder are added by feeder tubes or other suitable means into the channel of the strap. The glass beads are sufficiently small to fill all of the void areas between the lugs and the walls of the lead based strap to support and protect the plate lugs and side walls of the terminal straps during the heating and melting of the plate strap lead alloy.

After the glass beads and flux have been applied in the melt zone, the case cover 56 of polypropylene is aligned with and heat sealed to the main body by heat welding or by any other suitable means as disclosed in FIG. 5. Temporary openings 57 in the case cover or top allow the escape of gasses during welding. These openings are also used as access openings for the supply of electrolyte to the glass mats within the case in a later operation after sufficient electrolyte has been added, the openings are closed by heat sealing or other suitable method.

The case cover 56 is formed with channel blocks, such as 58, that act as stoppers for the end of the channels 14, 14' to prevent the escape of beads and flux from the region between the lugs.

After this installation, the battery is ready for the burn of the terminal straps to the electrode plate lugs without damage to the polyethylene battery case.

The burning procedure is illustrated in FIGS. 6 and 7 in which the battery case 26, which is already sealed by the cover 56 is seated in a tank 60 which is partially filled to a predetermined level 61 with deionized water 62 circulated thereto from a source not shown. The case has elongated protruding wall portions 63 conforming substantially to the shape of the straps 12 and form internal retainer channels 66 to accommodate the straps 12, 12' which fit therein and, along with teh insulator material 30, serve as molds for containing the molten metal during the welding operation. These wall portions 63 are cradled by an elongated induction coil assembly 70 that is mounted within the body of water and supported by the bottom of the tank.

As indicated above, the heat for amalgamation of the lugs to the strap is by the induction heating in which heat is generated by the induction coil assembly 70 which is within the water and out of contact with the parts being amalgamated. A power supply unit, not illustrated, converts regular line current into a high frequency low voltage current. As the current flows through the water-cooled tubular coils 72 of the induction coil assembly 70 which partially surrounds the strap 12 to be amalgamated with the lugs, a magnetic field is created.

When an electrically conductive object such as the strap and lugs are exposed to such magnetic field, an electromotive force is induced in the conductive material. This sets up a current blank and the resistance of the strap to the flow of current causes instant somewhat localization heating to occur. The heat is relatively near the surface of the metal and any interior heating results from thermal conduction from the hot surfaces of the tabs and the adjacent areas of the strap.

The power supply for the high frequency current may be a motor generator or any suitable source. The induction coil assembly has turns of insulated water-cooled copper tubing 72 around an iron core 73 encased in a suitable block 74 of a binder such as iron ferrite and epoxy. The tubing 72 provides an internal passage for circulating of cooling water so that the work coil is kept cool during operation. The number of turns of copper tubing of the block 74 is governed by the heat zone to be developed. Metallic magnetic flux reflectors 78 embedded in block 74 direct the field to the amalgamation zone.

Heat input is also regulated to some extent by varying the gap between the induction coil assembly and the parts to be amalgamated.

As indicated above, energy heat is generated to amalgamate the lugs and straps together without heat damage to the case of plastics material. The coil is subsequently deenergized and the case inverted and the other end thereof placed in the tank so that the other strap and the associated lugs can be amalgamated in the same manner to complete the connection.

During amalgamation the glass beads if used rise to the upper surface of the melt and some may crystalize in this position.

While the above description constitutes preferred embodiments of the invention, it will be appreciated that the invention can be modified and varied without departing from the scope of the accompanying claims.

We claim:

1. A method of joining laterally spaced metallic electrode plates mounted in a battery case of heat sensitive material each of said plates having a main body and lug projecting from said main body into a channel formed in an elongated strap portion of a battery terminal unit operatively mounted in said case and enclosed therein, comprising the steps of placing a heat insulating particulate in said channel and between the laterally spaced lugs, immersing said strap and enclosing case into a liquid coolant and the magnetic field of an electrical indication bearing coil, energizing said induction coil to apply heat energy to said strap sufficient to cause portions of said strap to become molten and fuse with said lugs to effect the connection of said strap to said plates while said case is protected from thermal degradation by said liquid coolant.

2. A method of making an electric storage battery having a case of heat sensitive material comprising the steps of: molding said case with a lead-based battery terminal embedded in at least one wall of said case, said terminal having a strap portion extending internally in the case and a terminal portion extending through said wall in a fluid tight manner, said strap portion having an elongated channel therein; providing a plurality of positive and negative polarity electrode plates each having a main body portion and a lug portion extending from said main body portion; alternatively interleaving positive polarity plates with negative polarity plates and a porous separator between adjacent plates and positioning the same in said case so that said lugs extend into said channel in said strap portion and said separators lie contiguous to said channel so as to form a closure therefor; filling said channel with insulating particulates sufficient to support said lugs during welding; sealing a cover to said case; immersing said terminal and wall into a liquid coolant; inductively heating said strap and lugs while immersed in said coolant until said strap and lugs become sufficiently molten to fuse together; and cooling said fused straps and lugs to solidly them and thereby complete the electric connection of said terminal to said electrode plates while the integrity of said wall is maintained by the liquid coolant.

3. A method of amalgamating the laterally spaced lugs extending from an end portion of laterally spaced electrode plates with separator mats therebetween to a strap of a terminal unit operatively mounted within a battery case of a heat sensitive material without heat degradation of the case and in which said strap has a terminus extending to the exterior of the case and has internal walls defining an elongated channel therein that is adapted to receive the lugs of the electrode plates comprising the steps of:
   a. fluxing the channel and said lugs to prepare them for subsequent amalgamation together,
   b. placing a heat insulation particulate in said channel in between the laterally spaced lugs in sufficient quantity to support and heat protect the plate lugs and the side wall of said strap defining said channel,
   c. immersing said case in a bath of water such that said strap is beneath the level of said water,
   d. providing an electrically energizable induction coil for generating a magnetic field within said water adjacent to said case;
   e. energizing said coil sufficiently to fuse said strap and lugs together while said case is protected against heat degradation by the cooling effects of said water,
   f. terminating the energizaiton of said coil so that said fused strap and lugs can solidify together to complete the electrical connection of said strap to said lugs, and
   g. removing said case from said water.

4. The method defined in claim 3 in which said lugs extend from opposite ends of interlayered plates and into channels in strap means molded into opposite ends of said case; said coil is energized to fuse a first strap and a first series of lugs together,
   said case is inverted so that the second strap is disposed adjacent to said coil, and
   said coil is energized to effect the amalgamation of said second strap to a second set of said lugs.

5. A method of making a storage battery in which laterally spaced lugs extending from spaced electrode plates with separators therebetween are amalgamated to strap means of terminal unit means operatively mounted within a wall of a battery case comprising a heat sensitive material, wherein said strap means include terminal means extending to the exterior of the case and elongated channel means receiving said lugs means of the electrode plates comprising the steps of:
   a. placing a heat insulating particulate in said channel means in between the laterally spaced lug means in sufficient quantity to support and insulate the plate lugs and the side wall of said strap defining the channel means thereof;
   b. sealing said battery case so that portions thereof are water tight to at least a water line above the plane of the lug-strap within the case;
   c. providing a tank of cooling water having a level which is below the water tight portion of said case;

d. providing an electrically energizable induction coil within said tank and adjacent to said, strap;

e. energizing said coil sufficiently to fuse said lugs and strap together, f. terminating the energizaiton of said coil so that said strap means and said lugs can solidify to complete the electrical connection of said strap means to said lugs.

6. The method defined in claim 5 in which said lugs means extend from opposite ends of plates within said case and into channels in said straps means molded in opposite ends of said case, sealing said case so that said strap means and said lugs are below the water line of said end when positioned in said tank adjacent said coil, energizing said coil to fuse a first strap means and a first series of lugs without heat degradation of said case adjacent such first strap, inverting said case so that a second strap means is disposed adjacent to said coil, and energizing said coil to fuse a second strap means to a second series of said lugs without heat degradation of said case adjacent such second strap.

7. A storage battery for generating electrical energy comprising a case of plastics material having end and side walls, terminal means of lead alloy molded in situ with respect to said case, said terminal means having (a) elongated strap means extending interiorly of said case from a position adjacent to one end wall of said case to a position adjacent to another end wall thereof, said strap means being initially formed with a channel therein, (b) a terminal end that extends through said one end wall of said case, and (c) a connector portion operatively connecting said terminal end to said strap means, positive and negative electrode plate means alternately interlayered within said case, said positive electrode plate means having lugs means extending initially into the channel of one of said strap means prior to welding, and said negative electrode plate means having lug means extending initially into said channel of another of said strap means prior to welding, separator means separating said electrode plates from one another, said lug means being welded to said strap means, and glass bead insulator means operatively positioned between said plate means said strap means interjacent said lug means.

8. A battery comprising ga case having closure walls of a heat sensitive plastics material, a first group of laterally spaced plates having a first electrical polarity mounted in said case, a second group of laterally spaced plates having an electrical polarity opposite to said first polarity and interdigitated with said first group of plates, separator means disposed between adjacent plates for separating said plates of each of said groups from one another, said first polarity plates having lug means integral therewith, terminal means defined by a head portion external of said case and an elongated strap portion extending from said heat portion internal of said case contiguous to a wall portion thereof and welded to said lug means, said strap portion of said terminal being initially formed with an elongated channel therein for receiving said lugs prior to welding of said lugs and said strap.

9. A method of joining laterally spaced metallic electrode plates mounted in a battery case of heat sensitive material each of said plates having a main body and lug projecting from said main body into a channel formed in an elongated strap portion of a battery terminal unit operatively mounted in said case and enclosed therein, comprising the steps of, placing said strap and enclosing case into a liquid coolant and the magnetic field of an electrical indication heating coil, energizing said indication coil to apply heat energy to said strap sufficient to cause portions of said strap to become molten and fuse with said lugs to effect the connection of said strap to said plates while said case is protected from thermal degradation by said liquid coolant.

10. A method according to claim 9 wherein said strap is embedded in said heat sensitive material.

11. A method according to claim 2 wherein said insulating particulates include a flux for facilitating the fusion of said lugs and said strap one to the other.

* * * * *